(12) United States Patent
Martin et al.

(10) Patent No.: US 8,684,680 B2
(45) Date of Patent: Apr. 1, 2014

(54) SEALING AND COOLING AT THE JOINT BETWEEN SHROUD SEGMENTS

(75) Inventors: Yves Martin, Boucherville (CA); Franco Di Paola, Montreal Nord (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 1165 days.

(21) Appl. No.: 12/548,516

(22) Filed: Aug. 27, 2009

(65) Prior Publication Data

US 2011/0052367 A1 Mar. 3, 2011

(51) Int. Cl.
*F01D 11/08* (2006.01)

(52) U.S. Cl.
USPC ........................................ 415/173.1

(58) Field of Classification Search
USPC ....................... 415/134, 139, 173.1
See application file for complete search history.

(56) References Cited

U.S. PATENT DOCUMENTS

| | | |
|---|---|---|
| 2,991,045 A | 7/1961 | Tassoni |
| 4,184,689 A | 1/1980 | Brodell et al. |
| 4,311,432 A | 1/1982 | Kildea |
| 5,145,316 A | 9/1992 | Birch |
| 5,988,975 A * | 11/1999 | Pizzi ............................ 415/139 |
| 6,503,051 B2 | 1/2003 | Predmore |
| 6,682,300 B2 | 1/2004 | Bolms |
| 6,808,363 B2 | 10/2004 | Darkins, Jr. et al. |
| 6,893,214 B2 | 5/2005 | Alford et al. |
| 6,899,518 B2 * | 5/2005 | Lucas et al. ................... 415/116 |
| 7,033,138 B2 * | 4/2006 | Tomita et al. ................. 415/139 |
| 7,063,503 B2 * | 6/2006 | Meisels ......................... 415/116 |
| 7,175,387 B2 | 2/2007 | Kreis et al. |
| 7,207,771 B2 * | 4/2007 | Synnott et al. ............. 415/173.1 |
| 7,374,395 B2 | 5/2008 | Durocher et al. |
| 7,387,488 B2 | 6/2008 | Nichols et al. |
| 7,448,849 B1 | 11/2008 | Webster et al. |
| 7,520,715 B2 | 4/2009 | Durocher et al. |
| 7,922,444 B2 * | 4/2011 | Propheter-Hinckley ...... 415/139 |

* cited by examiner

*Primary Examiner* — Nathaniel Wiehe
*Assistant Examiner* — Ryan Ellis
(74) *Attorney, Agent, or Firm* — Norton Rose Fulbright Canada LLP

(57) ABSTRACT

A gas turbine engine shroud includes a plurality of shroud segments disposed circumferentially one adjacent to another to form a full, circumferentially segmented ring about the rotor. The radial seal between each pair of adjacent shroud segments is positioned on the back side of the shroud platform. Cooling underneath the radial seals may be done by conduction heath transfer through the platform of the shroud segments.

14 Claims, 3 Drawing Sheets

SEALING AND COOLING AT THE JOINT BETWEEN SHROUD SEGMENTS

TECHNICAL FIELD

The application relates generally to gas turbine engines and, more particularly, to a seal mounting arrangement for providing sealing and cooling at the joint area between circumferentially adjacent segments of a segmented shroud.

BACKGROUND OF THE ART

Turbine shroud segments typically have slots or pockets defined in the opposed circumferential ends of their respective platforms for receiving strip seals to prevent leakage between circumferentially adjacent shroud segments. The presence of such seal receiving slots in the opposed circumferential adjoining ends of the shroud segments limits conduction heat transfer through the shroud platform from the radially inner hot gas path side to the radially outer cold back side of the platforms at the seal region between adjacent shroud segments. Consequently, the thin lip of material underneath each seal receiving slot tends to remain hotter than the remainder of the shroud platform and is, thus, subject to premature deterioration.

Various attempts have been made to improve cooling of the seal region between adjacent shroud segments. However, the various proposed designs remain to some extend unsatisfactory. A new shroud sealing arrangement addressing the above mentioned concerns and other limitations of the prior art is thus desirable.

SUMMARY

In a first aspect of the present application, there is thus provided a gas turbine engine shroud surrounding a rotor mounted for rotation about a central axis of a gas turbine engine, the shroud comprising a plurality of shroud segments disposed circumferentially one adjacent to another to form a full ring about the rotor, each of the shroud segments having a platform extending circumferentially between opposed first and second ends and opposed front and rear axially facing sides, the platform having a radially inner gas path surface and an opposed radially outer back surface, and a plurality of radially facing seals provided between adjacent shroud segments, the circumferentially opposed first and second ends of the platform of the shroud segments being free of seal receiving slots, the radially facing seals being disposed radially outwardly of the platform of the shroud segments with a radially inner facing surface of the radial seals laying on the radially outer surface of adjacent platforms, thereby providing for a continuous conduction heat transfer path underneath the radially facing seals through the platform from the radially inner gas path surface to the radially outer back surface.

In a second aspect, there is provided a shroud segment of a circumferentially segmented shroud of a gas turbine engine, comprising a platform having a gaspath side and an opposed back side extending circumferentially between opposed first and second ends and opposed front and rear axially facing sides, axially spaced-apart front and rear legs extending radially from said back side of the platform, said front and rear legs defining with said back side of the platform a plenum for receiving cooling air, and oppositely axially facing slots defined in each circumferential end face of said front and rear legs for holding a radially facing inter-segment seal in cooperation with an adjacent pair of slots of the front and rear legs of an adjacent shroud segment.

In a third aspect, there is provided a method for sealing and cooling circumferentially adjacent shroud segments in a gas turbine engine, each shroud segment being provided with a platform having a gas path side and an opposed back side, the method comprising: a) mounting radially facing inter-segment seals on the back side of the platform between each pair of adjacent shroud segments, and b) cooling underneath the inter-segment seals by conduction heat transfer from the gas path side to the opposed back side of the platform.

DESCRIPTION OF THE DRAWINGS

Reference is now made to the accompanying figures, in which.

DETAILED DESCRIPTION OF THE PREFERRED EMBODIMENTS

Figure 1:
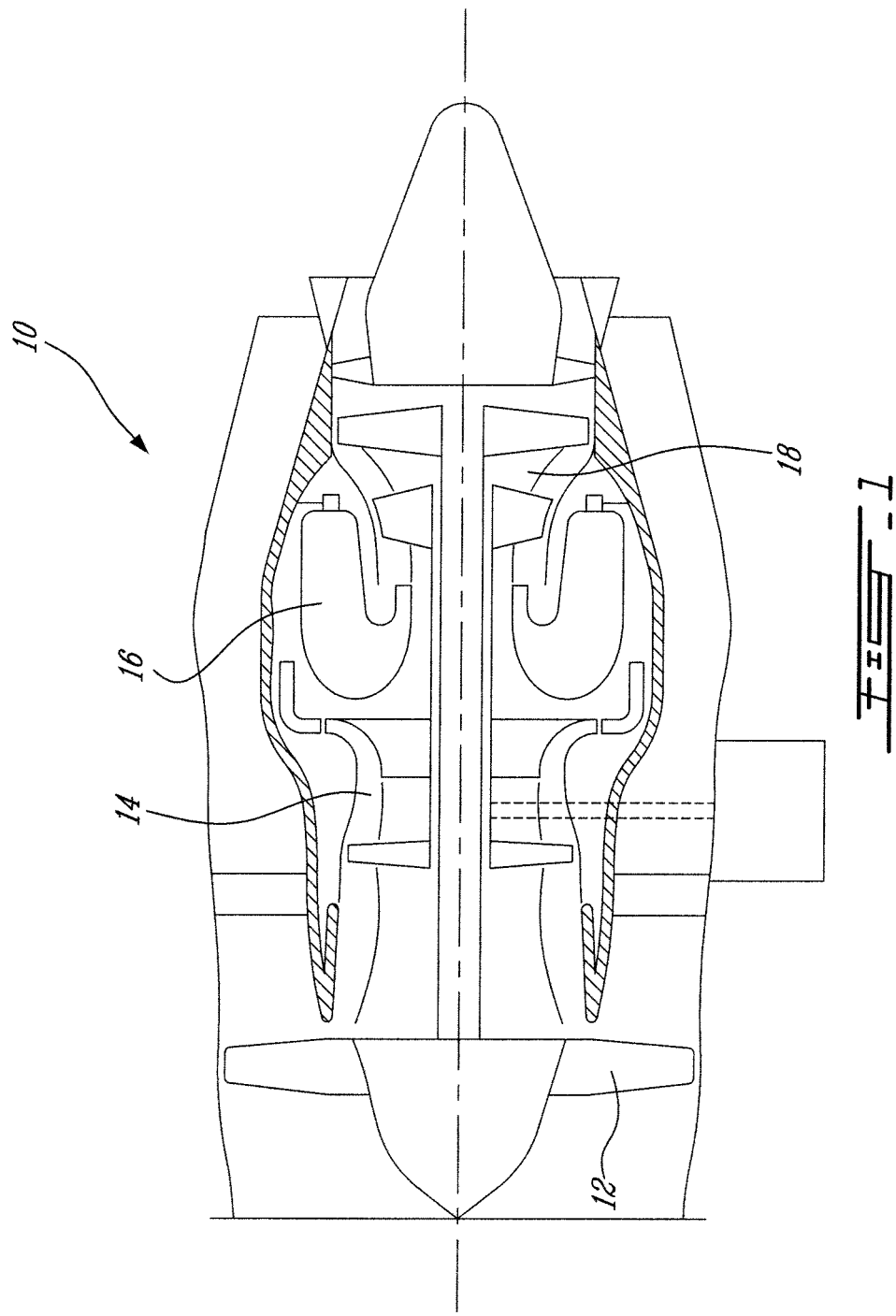
FIG. 1 is a schematic cross-section view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
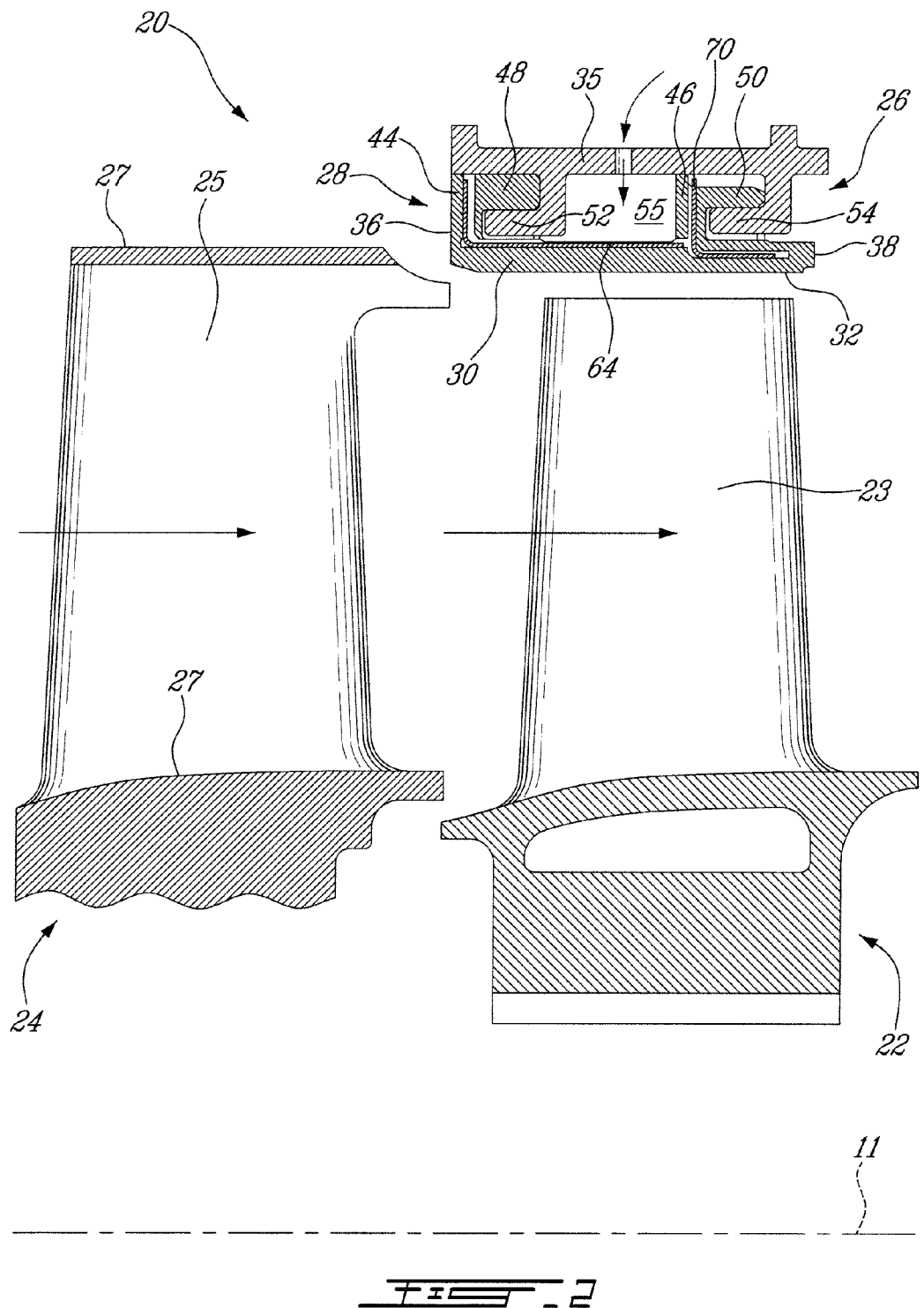
FIG. 2 is an enlarged cross-section view of a portion of the turbine section of the engine shown in FIG. 1, illustrating a stationary segmented shroud closely surrounding the tip of the blades of a turbine rotor.

Referring to FIG. 2, a high pressure (HP) turbine stage 20 of the turbine section 18 of the engine 10 includes generally a HP turbine rotor 22 having a plurality of radially extending blades 23 and a turbine stator vane assembly 24 comprising a plurality of vanes 25 extending between inner and outer vane platforms 27. Surrounding the turbine blades 23, and downstream of the stator vane assembly 24, is a stationary annular turbine shroud 26, which typically comprises a plurality of circumferentially adjoining shroud segments 28 concentrically arranged around the periphery of the turbine blade tips so as to define a portion of the radially outer boundary of the engine gas path. The shroud segments 28 are individually supported and located within the engine by an outer housing support structure 35 so as to collectively form a continuous shroud ring about the turbine blades 23.

Figure 3:
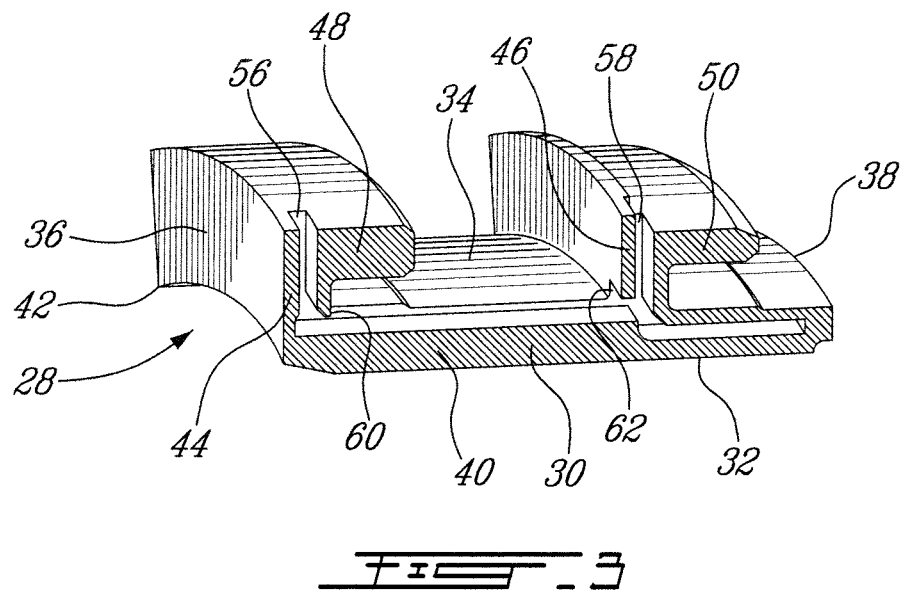
FIG. 3 is an isometric view of one of the segments of the shroud illustrated in FIG. 2.
Figure 4:
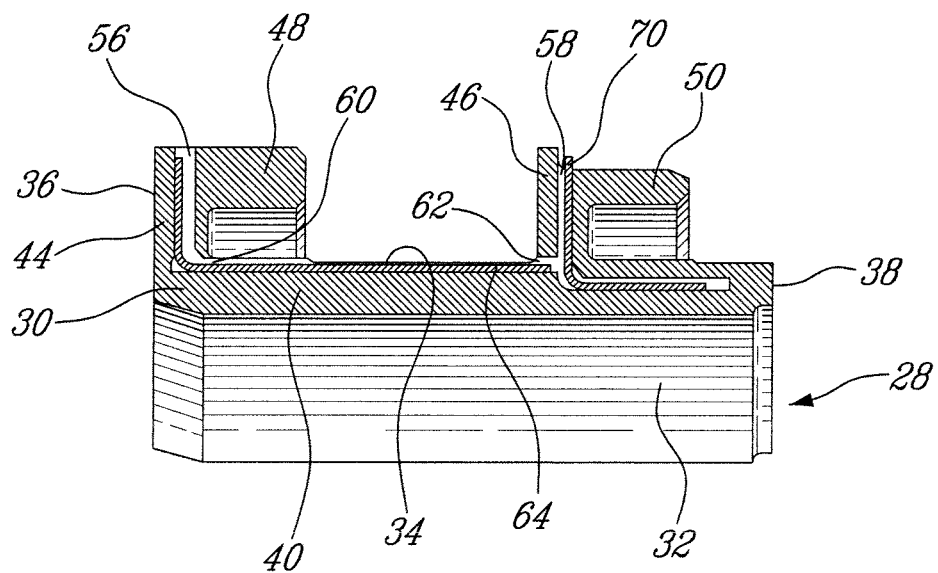
FIG. 4 is an end view of the shroud segment with a seal member mounted on the radially outermost surface of the shroud segment, the seal projecting from one circumferential end of the segment for spanning the circumferential gap between two adjacent shroud segments.

FIGS. 3 and 4 show one of the shroud segments 28 in more detail. The shroud segment 28 generally comprises a generally arcuate platform 30 having a radially inner gas path surface 32 which is adapted to be exposed to the hot combustion gases during engine operation and an opposed radially outer cold surface 34 also referred to as the back side of the platform 30. The platform 30 extends axially between an axially facing leading side 36 and an axially facing trailing side 38 and between circumferentially opposed ends 40, 42. Once the shroud 26 is assembled, the first circumferential end 40 of the platform 30 of each shroud segment substantially mate with a corresponding second circumferential end 42 of an adjacent segment to form an essentially continuous annular shroud. Axially spaced-apart front and rear legs 44, 46 extend integrally radially outwardly front the radially outer surface 34 of the platform 30. The radial legs 44, 46 are provided with respective axially projecting distal hook or rail portions 48, 50 for engagement with corresponding mounting flange projections 52, 54 (see FIG. 2) of the surrounding support structure 34. A shroud plenum 55 (FIG. 2) is defined between the radial legs 44, 46 and the radially outer surface 34 of the platform 30 for receiving cooling air from a cooling air source, for example bleed air from the compressor 14.

Referring to FIG. 3, radially extending slots 56, 58 are respectively defined in the front and rear radial legs 44 and 46 at both circumferential ends 40, 42 of each shroud segment 28. Recess or slot 60, 62 are defined in the axially opposed facing sides of the radial legs 44, 46 (i.e. the plenum side of the legs) generally at the root thereof that it is generally at the junction of the legs with the radially outer surface 34 of the platform 30. The oppositely axially facing slots 60, 62 are defined in the legs 44, 46 at both circumferential end faces 40, 42 of the shroud segment 28. The slots 60 and 62 may respectively intersect the radially inner end of radial slots 56 and 58 (i.e. the slots 60 and 62 may respectively open to the radial slots 56, 58).

As shown in FIG. 4, the oppositely axially facing slots 60, 62 in the circumferentially spaced-apart end faces of the legs 44, 46 may be provided in the form of slits configured to respectively loosely receive opposed axial ends of one side of a radial inter-segment seal member 64 adapted to provide sealing between two circumferentially adjacent shroud segments 28. Each inter-segment seal member 64 is received within the cavity formed by the oppositely circumferentially facing slots 60, 62 of adjacent shroud segments 28. As shown in FIG. 4, the seal member 64 may be provided in the form of a thin, flexible sheet metal seal laid in direct contact against the radially outer surface 34 of the platform 30 and retained thereon by the engagement of the opposed strip seal in slots 60, 62. By so positioning the inter-segment seal members 64 on the outside of the platform 30 of the shroud segments 28, the provision of a seal receiving slot in the platform itself between gas path side surface 32 and the back surface 34 can be avoided and as such the thickness of the platform 30 at the circumferentially opposed adjoining ends 40 and 42 can be maximized, thereby providing for effective conduction heat transfer from the hot gas path surface 32 to the cold back surface 34 underneath the seal members 64. The elimination of the seal receiving slots in the circumferential ends of the platform 30 provides for a continuous heat conduction path through the full thickness of the platform in the regions where the seal members overlap the platforms of adjacent shroud segments 28, thereby allowing for more uniform heat diffusion along the platforms 30. In this way, the platform material underneath the seal members 64 can remain cooler and durability may be improved. By improving the cooling of the platform at the seal areas between adjacent shroud segments, used of thermal barrier coatings and expensive temperature resistant materials may be avoided, thereby resulting in additional costs savings. The platform material underneath the seal members 30 may be cooled by conduction only. No extra dedicated cooling air is thus required.

Furthermore, by mounting the inter-segment seals 64 between the front and rear legs 44, 46 on the radially outer surface 34 of the platform 30, the seal members 64 are directly exposed to the cooling air directed in the shroud plenum 55. This may contribute to improve the durability of the seal members 64.

As shown in FIG. 4, the front axial end portion of the seal members 64 can be bent from axial to radial into the front radial slot 56, thereby not only providing radial but also axial sealing between the shroud segments 28. Likewise, the rear axial end portion of the seal member 64 could extend radially along the rear radial slot 58 to substantially prevent cooling air in the shroud plenum 55 from leaking axially through the gap between the rear legs 46 of adjacent shroud segments 28. However, in the illustrated embodiment, a conventional feather seal 70 is provided in the slot 58 to axially seal the gap between the oppositely facing rear legs 46 of circumferentially adjacent shroud segments 28. As shown in FIG. 4, the rear radial slot 58 may extend radially inwardly into the platform 30 and then axially rearwardly towards the rear edge of the platform 38 to accommodate an L-shaped feather seal having radial and axial components.

The above description is meant to be exemplary only, and one skilled in the art will recognize that changes may be made to the embodiments described without departing from the scope of the invention disclosed. For example, it is understood that the above described principles are equally applicable to the constructions of any annularly segmented shroud structures requiring cooling in a gas turbine engine and as such these principles are not limited to a high pressure turbine shroud as exemplified herein above. Still other modifications which fall within the scope of the present invention will be apparent to those skilled in the art, in light of a review of this disclosure, and such modifications are intended to fall within the appended claims.

What is claimed is:

1. A gas turbine engine shroud surrounding a rotor mounted for rotation about a central axis of a gas turbine engine, the shroud comprising a plurality of shroud segments disposed circumferentially one adjacent to another to form a full ring about the rotor, each of the shroud segments having a platform extending circumferentially between opposed first and second ends and opposed front and rear axially facing sides, the platform having a radially inner gas path surface and an opposed radially outer back surface, each of the shroud segments having axially spaced-apart front and rear legs extending radially outwardly from the radially outer back surface of the platform, and a plurality of radially facing seals provided between adjacent shroud segments, the circumferentially opposed first and second ends of the platform of the shroud segments being free of seal receiving slots between the front and rear legs, the radially facing seals being disposed radially outwardly of the platform of the shroud segments with a radially inner facing surface of the radial seals laying on the radially outer surface of adjacent platforms, the radially facing seals being spaced from the inner gas path surface by a locally full thickness of the platform between the front and rear legs, thereby providing for a continuous conduction heat transfer path underneath the radially facing seals through the platform from the radially inner gas path surface to the radially outer back surface.

2. The shroud defined in claim 1, wherein oppositely axially facing slots are respectively defined in said front and rear legs, the radially facing seals being received in said axially facing slots of the front and rear legs of circumferentially adjacent ones of said shroud segments.

3. The shroud defined in claim 2, wherein said oppositely axially facing slots are provided at a root portion of said front and rear legs at a junction of the front and rear legs with the radially outer back surface of the platform.

4. The shroud defined in claim 3, wherein said oppositely axially facing slots intersect respective radially extending front and rear slots respectively defined in said front and rear legs.

5. The shroud defined in claim 4, wherein said radially facing seals have a radial component extending into at least one of said front and rear slots.

6. The shroud defined in claim 1, wherein said platform is free of cooling holes underneath said radially facing seals.

7. The shroud defined in claim 1, wherein a plenum is defined between said front and rear legs, said radially facing seals being provided at a bottom of said plenum.

8. The shroud defined in claim 1, wherein the radially facing seals are laid flat in direct contact over a major surface area thereof against the radially outer back surface of the platform of the shroud segments.

9. A shroud segment of a circumferentially segmented shroud of a gas turbine engine, comprising a platform having a gaspath side and an opposed back side extending circumferentially between opposed first and second ends and opposed front and rear axially facing sides, axially spaced-apart front and rear legs extending radially from said back side of the platform, said front and rear legs defining with said back side of the platform a plenum for receiving cooling air, and oppositely axially facing slots defined in each circumferential end face of said front and rear legs at a junction region of the front and rear legs and the platform for holding a radially facing inter-segment seal in cooperation with an adjacent pair of slots of the front and rear legs of an adjacent shroud segment, and wherein the opposed first and second ends of the platform of the shroud segment are free of seal receiving slots between the front and rear legs, the radially facing inter-segment seal being spaced from the gas path side by a locally full thickness of the platform between the front and rear legs.

10. The shroud segment defined in claim 9, wherein said oppositely axially facing slots respectively intersect radially extending seal receiving slots defined in said front and rear legs.

11. The shroud segment defined in claim 9, wherein the platform is free of cooling holes in the inter-segment seal area of the platform.

12. A method for sealing and cooling circumferentially adjacent shroud segments in a gas turbine engine, each shroud segment being provided with a platform having a gas path side surface and an opposed back side surface, radially facing inter-segment seals being provided for sealing between adjacent shroud segments, the method comprising: a) locally maximizing the thickness of platform material underneath the radially facing inter-segment seals by mounting the radially facing inter-segment seals against the back side surface of the platform between each pair of adjacent shroud segments, each platform being free of seal receiving slots between opposed front and rear legs extending from the back side surface of the platform, the radially facing inter-segment seals being spaced from the gas path side surface by a locally full thickness of the platform between the front and rear legs; and b) cooling underneath the inter-segment seals by conduction heat transfer through the locally full thickness of the platform from the gas path side to the opposed back side of the platform.

13. The method defined in claim 12, wherein a) comprises inserting the inter-segment seal in axially facing slots defined in axially spaced-apart front and rear mounting legs extending radially from the back side of the platform of each shroud segment.

14. The method defined in claim 13, wherein the axially facing slots intersect radial slots defined in the front and rear legs, and wherein a) comprising engaging a radial component of the inter-segment seals in the radial slots to provide axial sealing as well as radial sealing.

* * * * *